US008686289B2

(12) United States Patent
Burke et al.

(10) Patent No.: US 8,686,289 B2
(45) Date of Patent: Apr. 1, 2014

(54) SEALING MECHANISM AND METHOD FOR DROP CABLE SPLICE ENCLOSURES

(75) Inventors: Edward J. Burke, Temecula, CA (US); Robert H. Gwillim, Temecula, CA (US)

(73) Assignee: Channell Commercial Corporation, Temecula, CA (US)

( * ) Notice: Subject to any disclaimer, the term of this patent is extended or adjusted under 35 U.S.C. 154(b) by 226 days.

(21) Appl. No.: 13/370,931

(22) Filed: Feb. 10, 2012

(65) Prior Publication Data
US 2013/0014974 A1 Jan. 17, 2013

Related U.S. Application Data

(60) Provisional application No. 61/507,988, filed on Jul. 14, 2011.

(51) Int. Cl.
H02G 15/013 (2006.01)
H02G 15/04 (2006.01)

(52) U.S. Cl.
USPC ........ 174/77 R; 174/650; 174/93; 174/152 R; 277/602; 277/607; 248/56

(58) Field of Classification Search
USPC ......... 174/135, 650, 152 G, 153 G, 652, 663, 174/77 R, 93, 60, 92, 152 R; 16/2.1, 2.2; 385/134, 135; 248/62, 56; 277/312, 277/314, 602, 620, 625, 607
See application file for complete search history.

(56) References Cited

U.S. PATENT DOCUMENTS

| 4,361,721 | A | * | 11/1982 | Massey ........................ 174/77 R |
| 4,538,021 | A | * | 8/1985 | Williamson, Jr. ............... 174/93 |
| 5,007,701 | A | | 4/1991 | Roberts |
| 5,067,783 | A | | 11/1991 | Lampert |
| 5,069,516 | A | | 12/1991 | Kohy et al. |
| 5,210,374 | A | | 5/1993 | Channell |
| 5,949,022 | A | * | 9/1999 | Park et al. .................... 174/77 R |
| 6,037,544 | A | * | 3/2000 | Lee et al. ........................ 174/93 |

(Continued)

FOREIGN PATENT DOCUMENTS

| EP | 1 215 791 A1 | 6/2002 |
| EP | 2 330 706 A1 | 6/2011 |

(Continued)

OTHER PUBLICATIONS

International Search Report and Written Opinion, International Application No. PCT/US2012/046958, Jul. 16, 2012, 13 pages.

Primary Examiner — Angel R Estrada
(74) Attorney, Agent, or Firm — Christie, Parker & Hale, LLP

(57) ABSTRACT

A sealing mechanism for a drop cable splice enclosure includes a base having an entry hole for receiving a drop cable inserted through a compression grommet assembly, from outside the enclosure. The cable can be prepared for splicing, outside the enclosure. The grommet assembly (and the optionally prepared cable) are inserted into the entry hole, from outside the enclosure. The assembly includes upper and lower pressure plates, a compressible grommet between them, and an adjustment mechanism to apply a compression force to the grommet. The grommet assembly is rotatable to lock it in a keyed section in the entry hole. The adjustment mechanism is then tightened, from outside the enclosure, to compress the grommet between the pressure plates, which seals the grommet in the enclosure base, at the same time sealing the cable in the passageway through the grommet.

16 Claims, 16 Drawing Sheets

(56) References Cited

U.S. PATENT DOCUMENTS

| | | | |
|---|---|---|---|
| 6,151,436 A * | 11/2000 | Burek et al. | 385/135 |
| 6,875,926 B2 * | 4/2005 | Buekers et al. | 174/77 R |
| 6,892,990 B2 | 5/2005 | Pisczak | |
| 7,263,265 B2 | 8/2007 | Grubish et al. | |
| 7,327,943 B2 | 2/2008 | Vo et al. | |
| 7,381,888 B2 | 6/2008 | Burke et al. | |
| 7,385,137 B2 | 6/2008 | Burke et al. | |
| 7,442,884 B2 * | 10/2008 | Ball et al. | 174/650 |
| 7,568,943 B2 | 8/2009 | Harrison et al. | |
| 7,650,055 B2 * | 1/2010 | Cox et al. | 174/77 R |
| 7,653,282 B2 | 1/2010 | Blackwell, Jr. et al. | |
| 7,780,173 B2 * | 8/2010 | Mullaney et al. | 277/621 |
| 7,869,681 B2 | 1/2011 | Battey et al. | |
| 2003/0095774 A1 | 5/2003 | Bohme et al. | |
| 2004/0245008 A1 | 12/2004 | Grubish et al. | |
| 2005/0207711 A1 | 9/2005 | Vo et al. | |
| 2008/0066949 A1 | 3/2008 | Cloud | |
| 2009/0283289 A1 | 11/2009 | Casenhiser et al. | |
| 2011/0168716 A1 | 7/2011 | Stransky et al. | |
| 2011/0262094 A1 | 10/2011 | Burke | |

FOREIGN PATENT DOCUMENTS

| | | |
|---|---|---|
| WO | WO 2004/051338 A1 | 6/2004 |
| WO | WO 2006/096839 A1 | 9/2006 |
| WO | WO 2006/127457 A1 | 11/2006 |
| WO | WO 2011/133541 A1 | 10/2011 |

\* cited by examiner

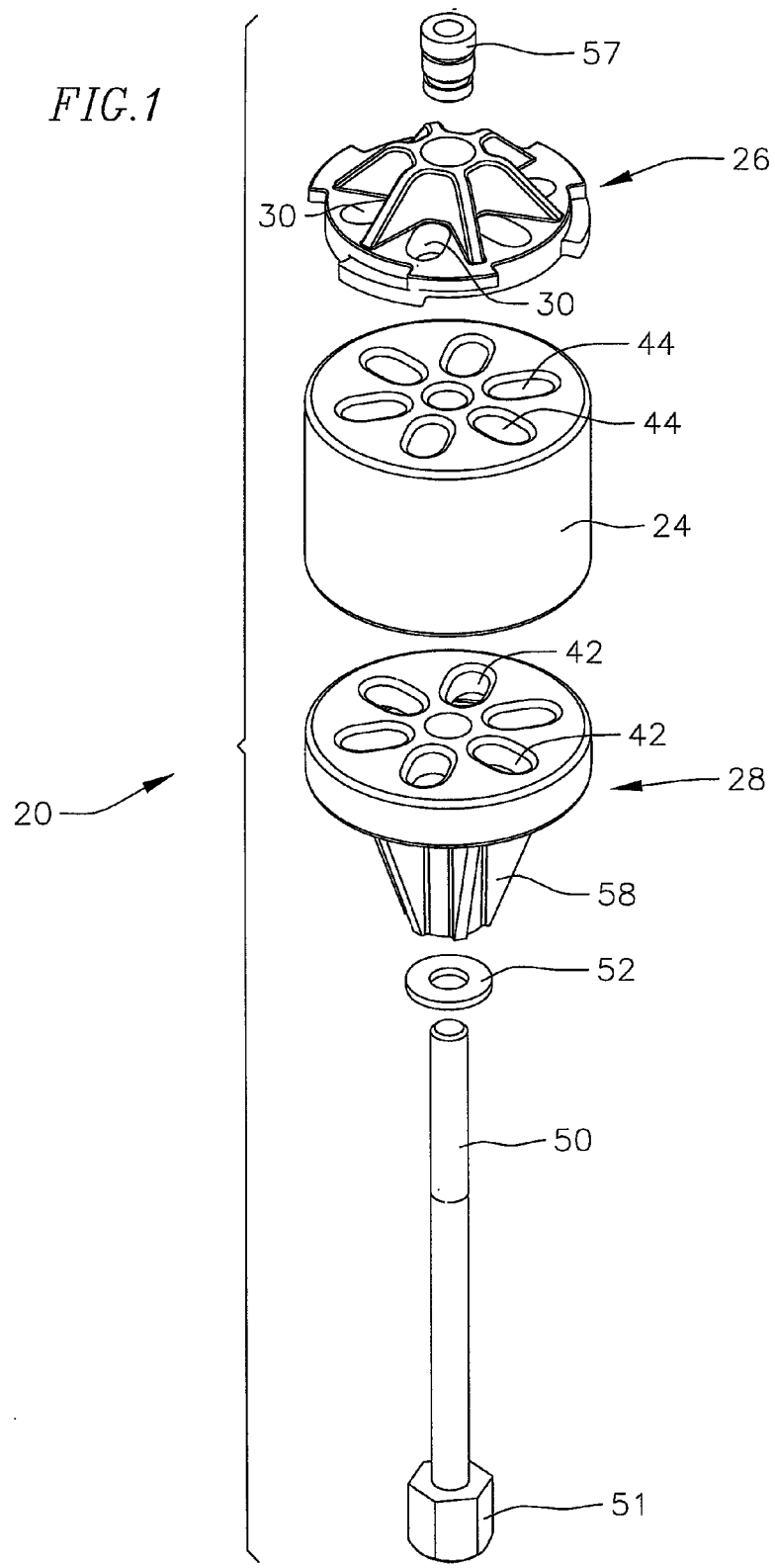

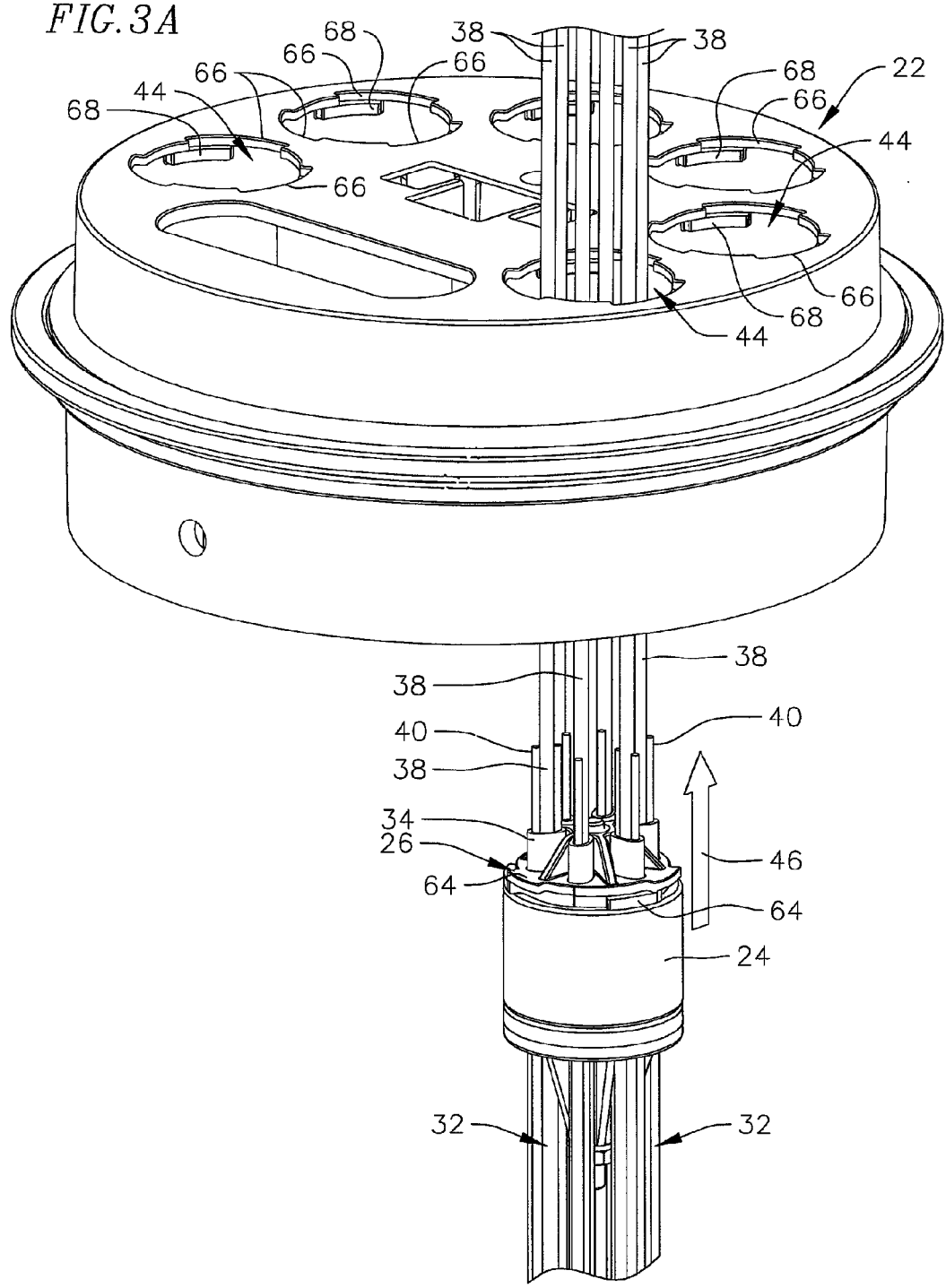

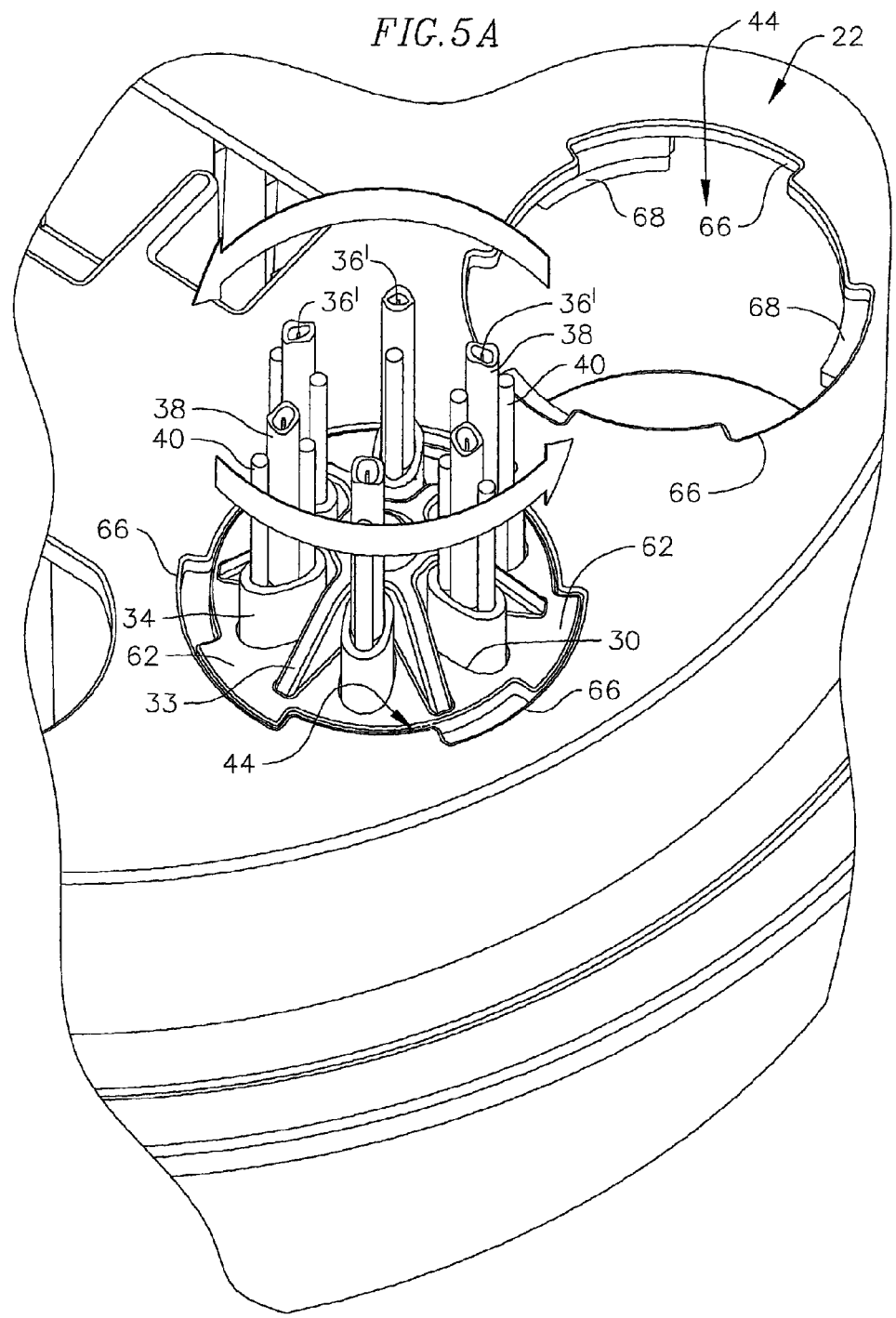

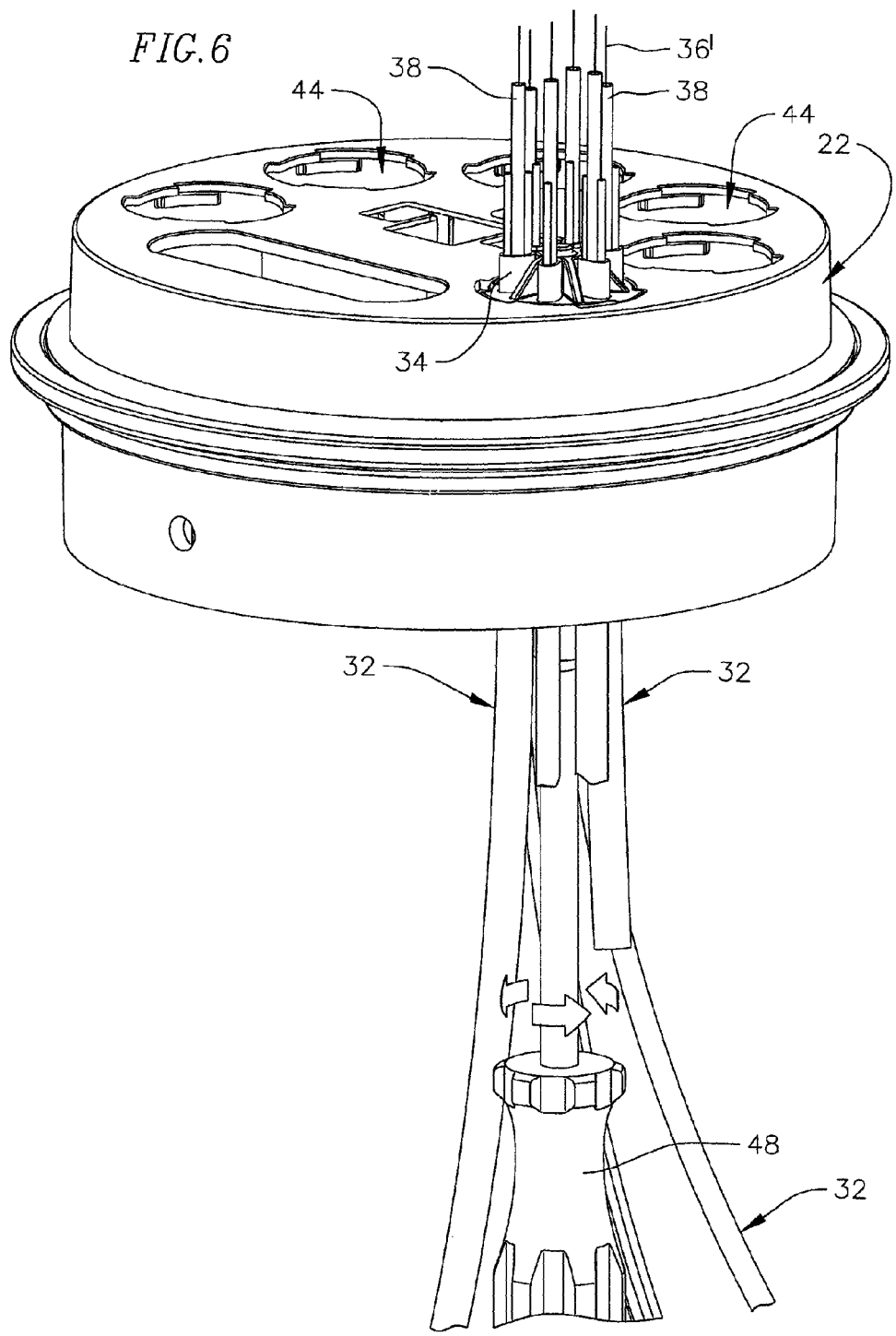

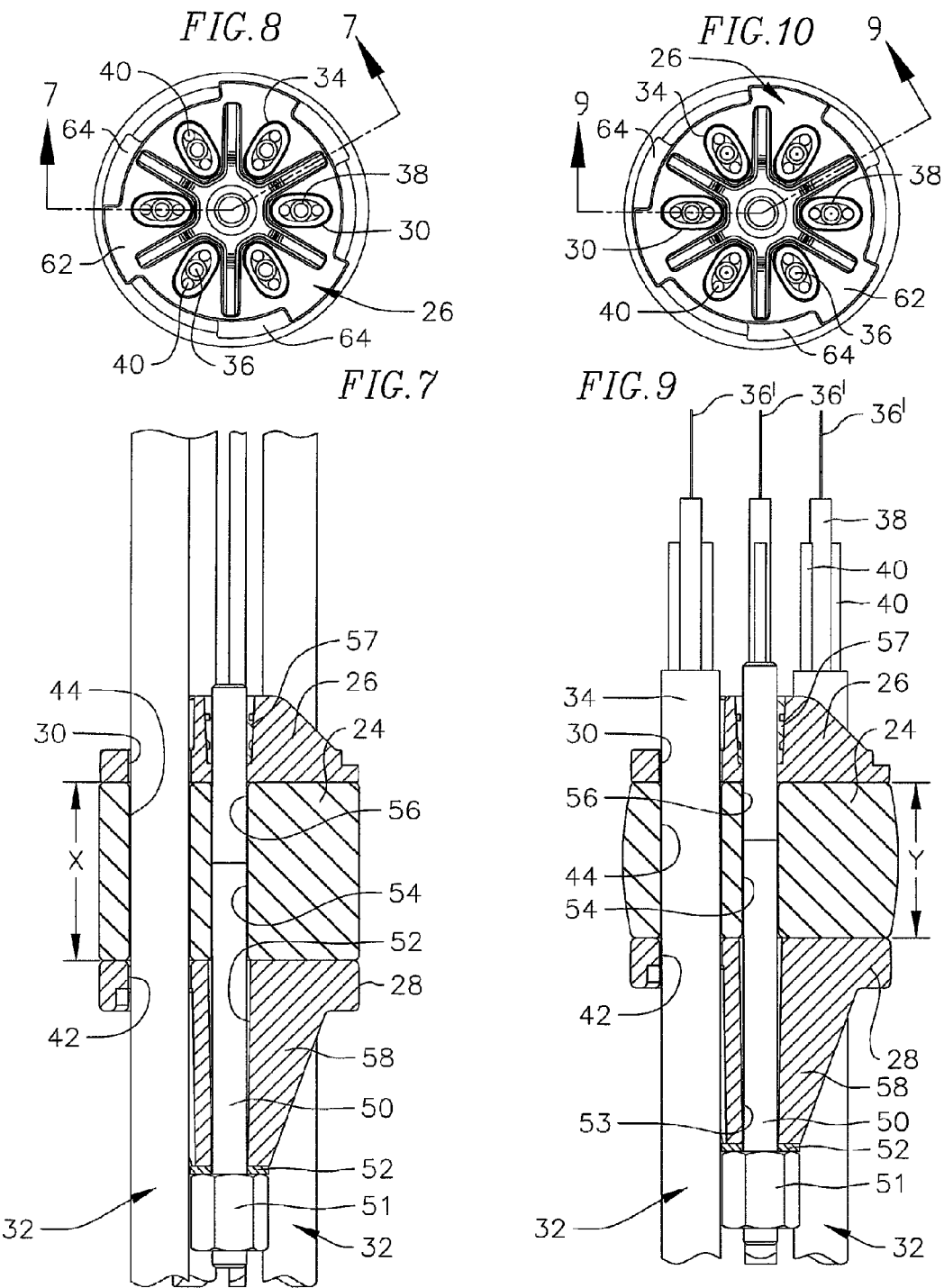

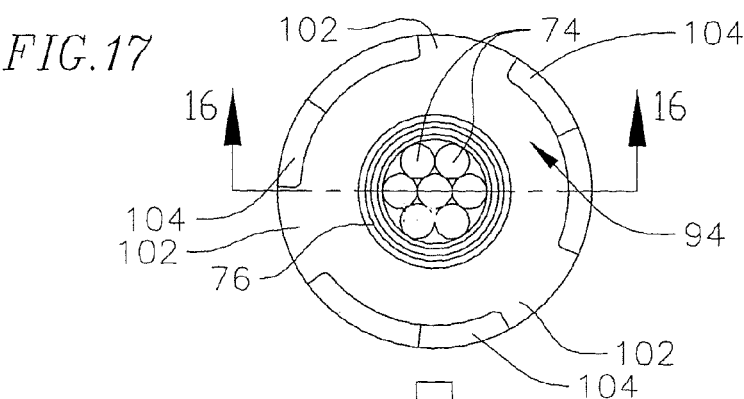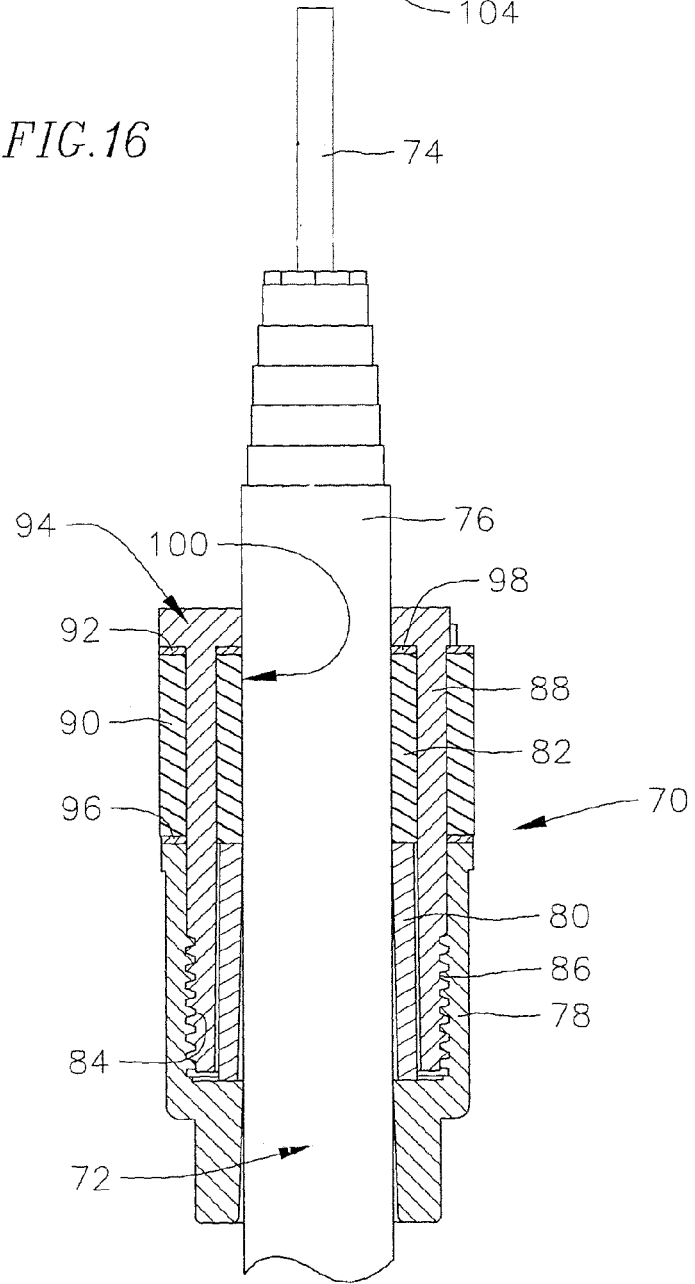

SEALING MECHANISM AND METHOD FOR DROP CABLE SPLICE ENCLOSURES

CROSS REFERENCE TO RELATED APPLICATION

This application claims priority to U.S. Provisional Application No. 61/507,988, filed Jul. 14, 2011, which is fully incorporated herein by this reference.

FIELD OF THE INVENTION

This invention relates to drop cable splice enclosures, and more particularly, to a method and mechanism for sealing communication transmission cables or drop wires in cable or wire splice enclosures.

A typical use of these splicing enclosures would be for fiber to the home (FTTH) optical fiber cables used in high speed broadband, telephone, and satellite television installations, or other communications cables or wires such as copper drop wire or aerial wire, and coaxial cables.

BACKGROUND

The following description of the invention relates to optical fiber cable installations and related optical fiber splicing, although certain aspects of the invention are applicable to other types of cable or wire splicing techniques and related cable splice enclosures.

One embodiment of the present invention provides a grommet assembly used for sealing fiber optic cables of various types in the entry holes contained in optical fiber cable splicing enclosures. Such enclosures are commonly placed in service in outdoor environments and are used in the storage, management and distribution of fiber optic cables that enter through sealed openings in the enclosure. The enclosures serve multiple functions including protecting the internal fiber optic cables and cable splices from the elements. They can contain optical fiber splice trays or other means for making and maintaining spliced connections between the optical fibers.

These enclosures can contain optical fiber wire splices for different types of optical fiber cable, including distribution cable or feeder cable, branch cables, and drop wire cable. Trouble-free entry and reentry to the enclosure for these fiber optic cables is a necessity for long term use in making the necessary cable splices.

In current optical fiber cable splicing enclosures, cable is fed through an entry hole in the enclosure and through a rubber grommet. The grommet is forced down into the hole, forming a seal. The interior space in most enclosures is limited, and it is difficult to prepare the end of the cable after it has been installed in the enclosure.

The present invention provides a solution to the problem, which includes installing the cable in a grommet, assembly, outside the enclosure, in preparation for sealing the cable in the grommet and sealing the grommet in an entry hole in the base of the enclosure.

SUMMARY

Briefly, according to one embodiment of the invention, a compression grommet assembly is prepared for use outside an optical fiber cable splicing enclosure. The grommet assembly is adapted to receive a fiber optic cable inserted into a passageway through the grommet assembly. The cable is initially prepared for splicing, preferably outside the enclosure, after the cable is inserted into the passageway through the grommet assembly. Cable preparation includes removing a cable sheath from the exterior of the cable, to free up the optical fiber wire contained in the cable. The compression grommet assembly and the cable are then inserted into an entry opening in the enclosure base. Once the grommet assembly is positioned in the entry opening, the grommet assembly is then secured in the opening by engaging a keyed locking mechanism that locks the grommet assembly in the opening. After the complete assembly is installed and locked in place, a rubber or elastomeric grommet material contained in the assembly can be compressed, from a compression force applied from outside the enclosure, to form a seal between the grommet and the entry opening. The grommet seals to irregular-shaped cables as well as standard, round-shaped cables. A seal is also formed between the grommet and the cable passing through the grommet. The fiber optic wire contained in the cable, which was prepared outside the enclosure, is then free to better facilitate fiber splicing inside the enclosure.

The compression grommet assembly, according to one embodiment of the invention, includes upper and lower pressure plates on opposite sides of the compressible grommet. The upper pressure plate has a keyed structure that can be rotated or otherwise moved into engagement with a cooperating keyed portion of the entry opening, to lock the grommet assembly in the entry opening. An adjustment mechanism on the grommet assembly is adapted to apply a compression force to the grommet, which then compresses the grommet between the pressure plates to seal the grommet in the entry opening while at the same time sealing the cable in the passageway through the grommet.

The cable sealing method and mechanisms according to this embodiment of the invention are applicable to and adapted for use with large multi-fiber distribution cable, branch cable, and single-fiber drop wire, as described in more detail in the following detailed description and the related drawings.

Other aspects of the invention also will be more fully understood by referring to the following detailed description and the accompanying drawings.

BRIEF DESCRIPTION OF THE DRAWINGS

FIG. 1 is an exploded perspective view showing a six-port compression grommet assembly according to one embodiment of this invention.

FIG. 3A is a perspective view showing the grommet assembly of FIG. 3, but more accurately showing the fiber optic cables that were prepared for splicing and have been inserted through passageways in the compression grommet assembly.

FIG. 5A is a perspective view similar to FIG. 5 but showing the buffer tubes of the fiber optic cables cut off, for clarity.

FIG. 6 is a perspective view showing a tool, such as a standard nut driver, being used to tighten components of the grommet assembly to compress the grommet for fowling a seal between the fiber drop wire and the enclosure base.

FIG. 7 is a cross-sectional view, taken on line 7-7 of FIG. 8, showing components of the compression grommet assembly of FIGS. 1-6, in a relaxed state.

FIG. 8 is a top view of the grommet assembly shown in FIG. 7.

FIG. 9 is a cross-sectional view, taken on line 9-9 of FIG. 10, showing components of the compression grommet assembly of FIG. 7, in a compressed state.

FIG. 10 is a top view of the grommet assembly shown in FIG. 9.

FIG. 16 is a cross-sectional view, taken on line 16-16 of FIG. 17, showing components of the compression grommet assembly of FIG. 15.

FIG. 17 is a top elevational view showing a large-diameter fiber optic cable passing through an opening in the alternative compression grommet assembly of FIGS. 15 and 16.

DETAILED DESCRIPTION

Figure 1A:
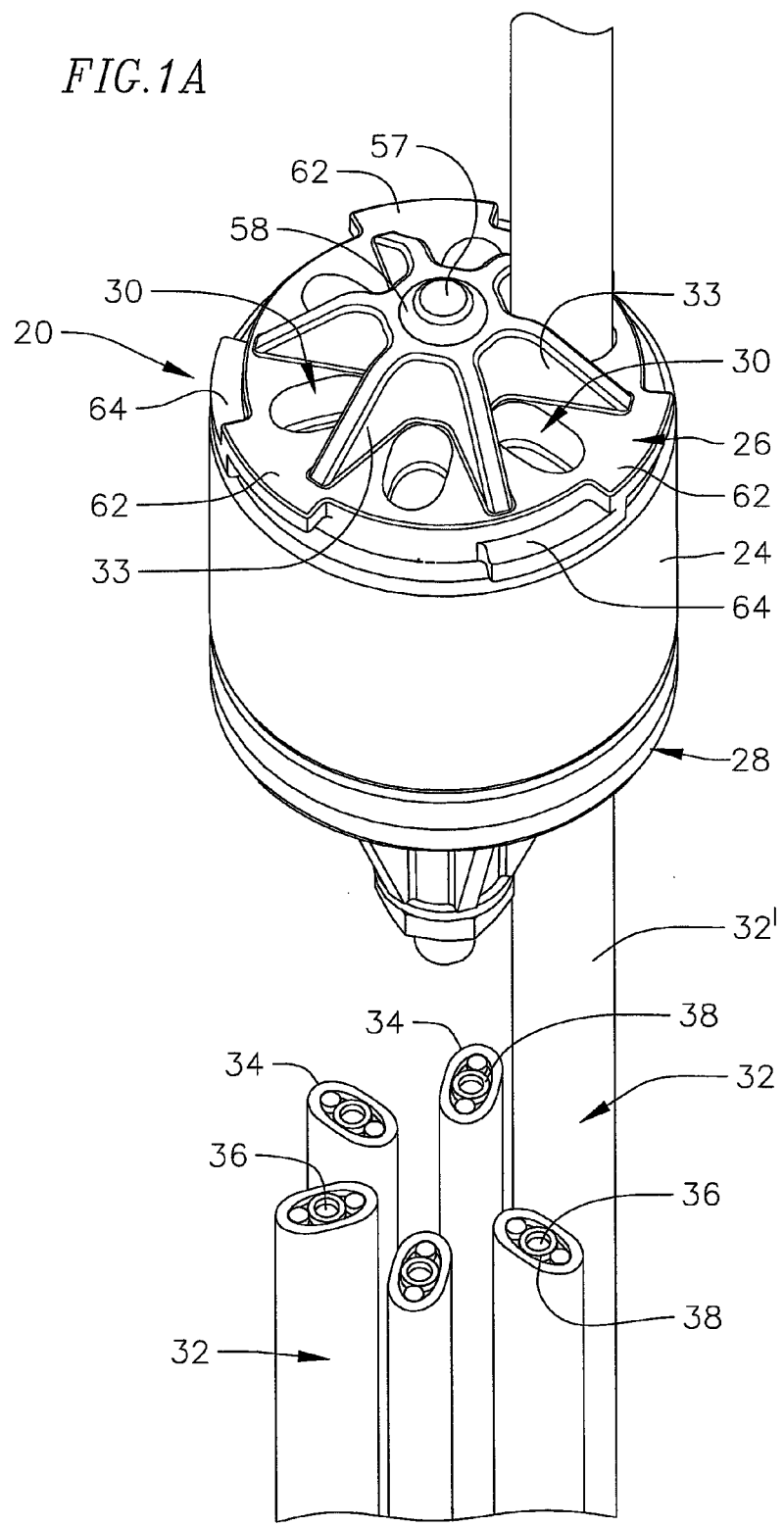
FIG. 1A is a perspective view showing fiber drop wire inserted, one at a time, through holes in the compression grommet assembly.

Referring to the drawings, FIGS. 1-13 show one embodiment of a compression grommet assembly 20 according to principles of this invention. This grommet assembly is used for sealing drop cables of various types in the entry holes contained in cable splicing enclosures. Such drop cables may include, but are not limited to, optical fiber cables, including distribution or feeder cables, branch cables, or fiber drop wire cables; copper drop wires or aerial wires; coaxial cables, or other communication wire or cable that may be installed in an enclosure for splicing or other distribution connections. One such enclosure is partially shown in FIGS. 3-6 which show a base section 22 of a cable splicing enclosure. Referring to FIGS. 1 and 1A, the compression grommet assembly 20 includes a compressible grommet 24, an upper pressure plate 26 on top, and a lower pressure plate 28 on the bottom of the grommet assembly. The pressure plates are rigid and are preferably made of hard plastic. The two pressure plates 26, 28 contain circumferentially spaced apart holes 30 (shown in the upper pressure plate) and holes 42 with the same spacing (in the lower pressure plate). The holes 30, 42 receive optical fiber cables such as the optical fiber drop cables 32 shown, as an example, in FIGS. 1A-6. Other types of communication cables can be used with the invention; the illustrated optical fiber drop cables are simply one example.

The upper pressure plate includes radially spaced apart ribs 33 between the holes 30 for added rigidity. The lower pressure plate contains elongated, spaced apart ribs 58 between the holes 42, also for added rigidity.

The optical fiber drop cables 32 are known in the art and generally include an outer insulating jacket or sheath 34 which contains an optical fiber wire 36 contained in a buffer tube 38, and a pair of tension members 40 on opposite sides of the optical fiber buffer tube. One of the drop cables is shown at 32' in FIG. 1A passing through the compression grommet assembly. The other drop cables are shown in position for being inserted one at a time into corresponding holes or passageways extending through the grommet assembly.

The internal construction of the grommet assembly, which is adapted to receive the drop cables, is best understood by initially referring to the cross-sectional view of FIG. 7. The grommet 24 is shown sandwiched between the upper pressure plate 26 and the lower pressure plate 28. The spaced apart holes 30 in the upper pressure plate 26 are aligned vertically with corresponding circumferentially spaced apart holes 42 in the lower pressure plate 28. The separate pairs of vertically aligned holes 30 and 42 in the pressure plates are also aligned with corresponding open-ended passages 44 extending through the depth of the grommet 24. The vertically aligned holes 30, 44 and 42 form separate passageways extending through the lower pressure plate, the grommet, and the upper pressure plate, for receiving corresponding ones of the drop cables 32. The holes of the passageways are preferably shaped to match the outer configuration of the drop cable, which is generally oval in shape as shown in FIG. 1, for example. The grommet assembly of this invention is adapted to seal around various irregular-shaped cables, as well as standard shapes such as round cables. The illustrated embodiment is optimized to seal to oval-shaped cables.

The procedure for inserting the drop cables into the base of the enclosure first involves inserting the cables, one at a time, through corresponding passageways in the grommet assembly 20. As illustrated in FIG. 1A, the cable 32' has been inserted through a corresponding passageway in the grommet assembly from a position outside of the enclosure base. Once the drop cables have been inserted through the passageways in the compression grommet assembly, the free ends of the cables are then prepared for subsequent cable splicing. The ends of the cables can be, and preferably are, prepared for splicing outside the enclosure. The ends of the drop cables are prepared by removing or stripping away the portion of the sheath 34 on the each cable which extends away from a location a short distance above the upper pressure plate 26. Removing the sheath from each cable frees up the optical fiber wires 36' for use in subsequent splicing, after the grommet assembly (and the prepared cables) have been inserted as a unit into the enclosure base, as described below.

Figure 2:
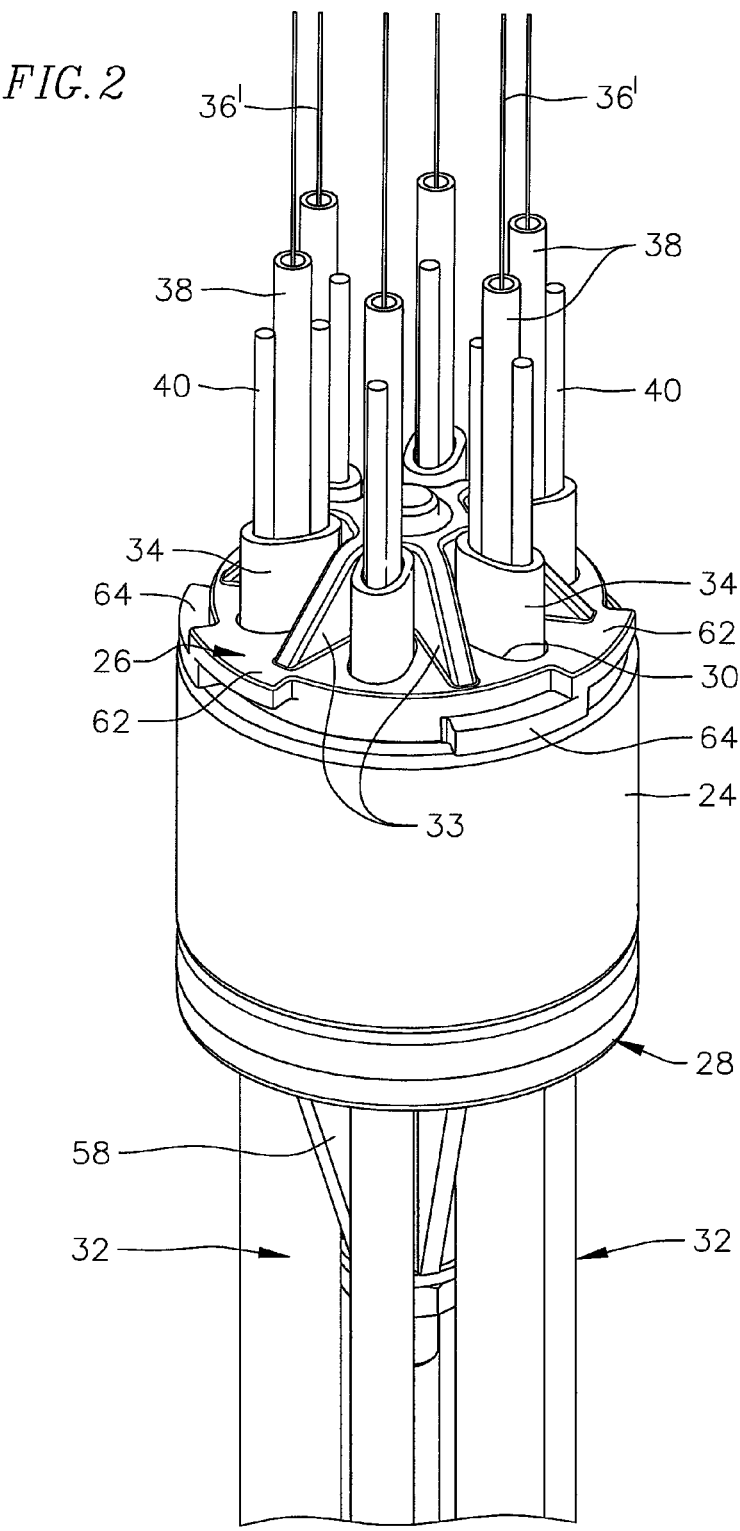
FIG. 2 is a perspective view showing the ends of the drop wires which have been prepared for fiber splicing, outside an optical fiber cable splicing enclosure.

FIG. 2 shows a group of the drop cables 32 after they have been inserted through their respective passageways in the grommet assembly, from a position exterior to the enclosure. The prepared ends of the cables are shown with the cables in their entirety having been inserted entirely through the upper pressure plate 26 of the grommet assembly. The prepared ends of the cables (the fiber optic wires 36', the buffer tubes 38, and the tension members 40) are exposed individually above the upper pressure plate 26.

Figure 3:
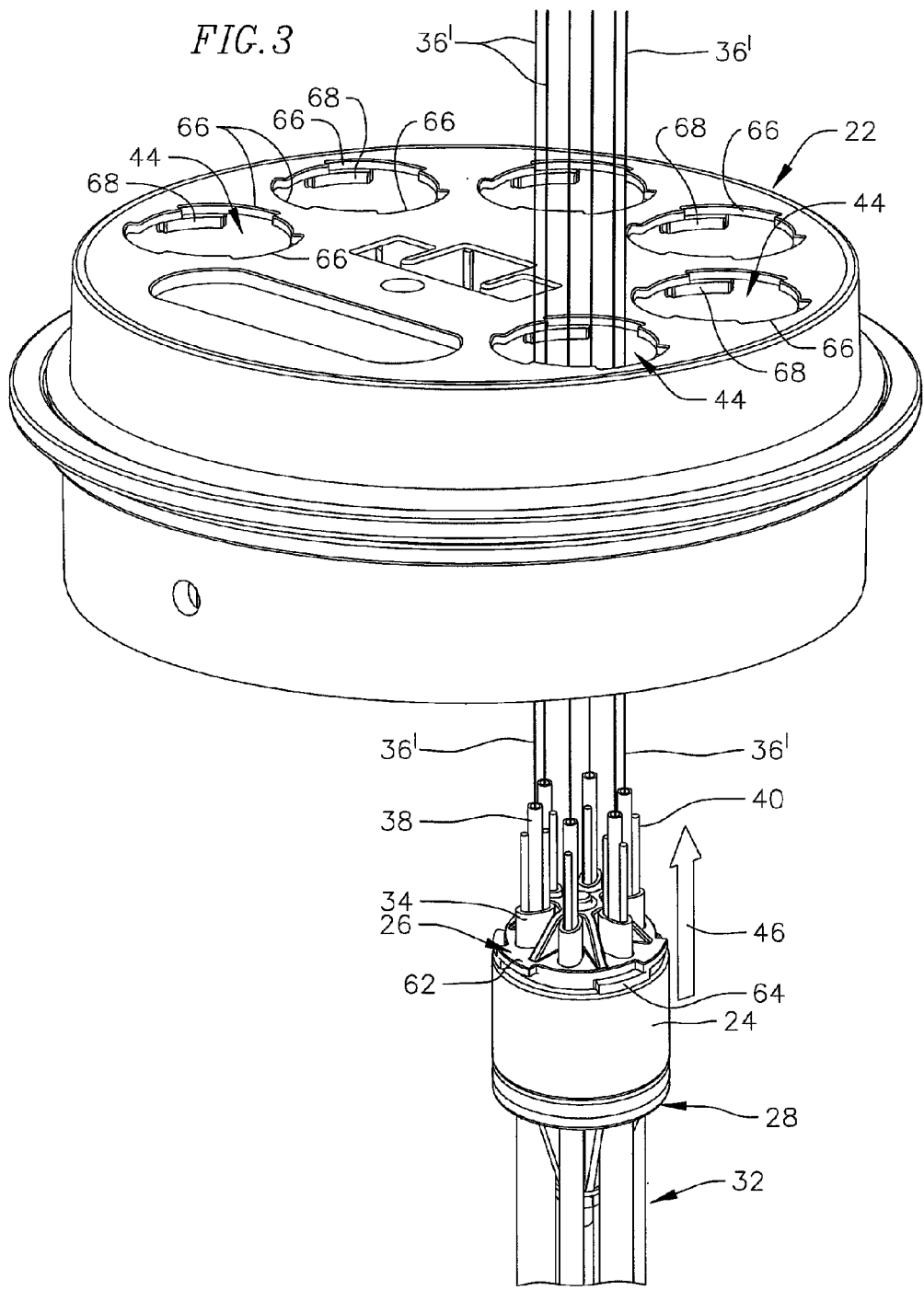
FIG. 3 is a perspective view showing the grommet assembly of FIG. 2 in the process of being fed through entry openings in the base of an optical fiber cable splicing enclosure.

FIG. 3 shows the next step in the process in which the prepared drop cables 32 (and the grommet assembly 20) are inserted through entry holes 44 in the base 22 of the enclosure, from a position outside the enclosure. As illustrated in FIG. 3, the grommet assembly is inserted through the bottom of the base opening (entry hole 44) in the upward direction as shown by the arrow 46. (The unsupported wires 36' are shown out of proportion as to their length from the free end of the cables, for clarity.)

FIG. 3A is similar to FIG. 3, but more accurately shows the fiber optic cables 32 that were prepared for splicing and have been inserted through the passageways in the compression grommet assembly. This view shows the sheath 34 having been removed, the ends of the tension members 40 shortened, and the buffer tubes 38 used for guiding and supporting the wires 36 as the grommet assembly is being inserted into the passage 44 through the base section 22.

Figure 4:
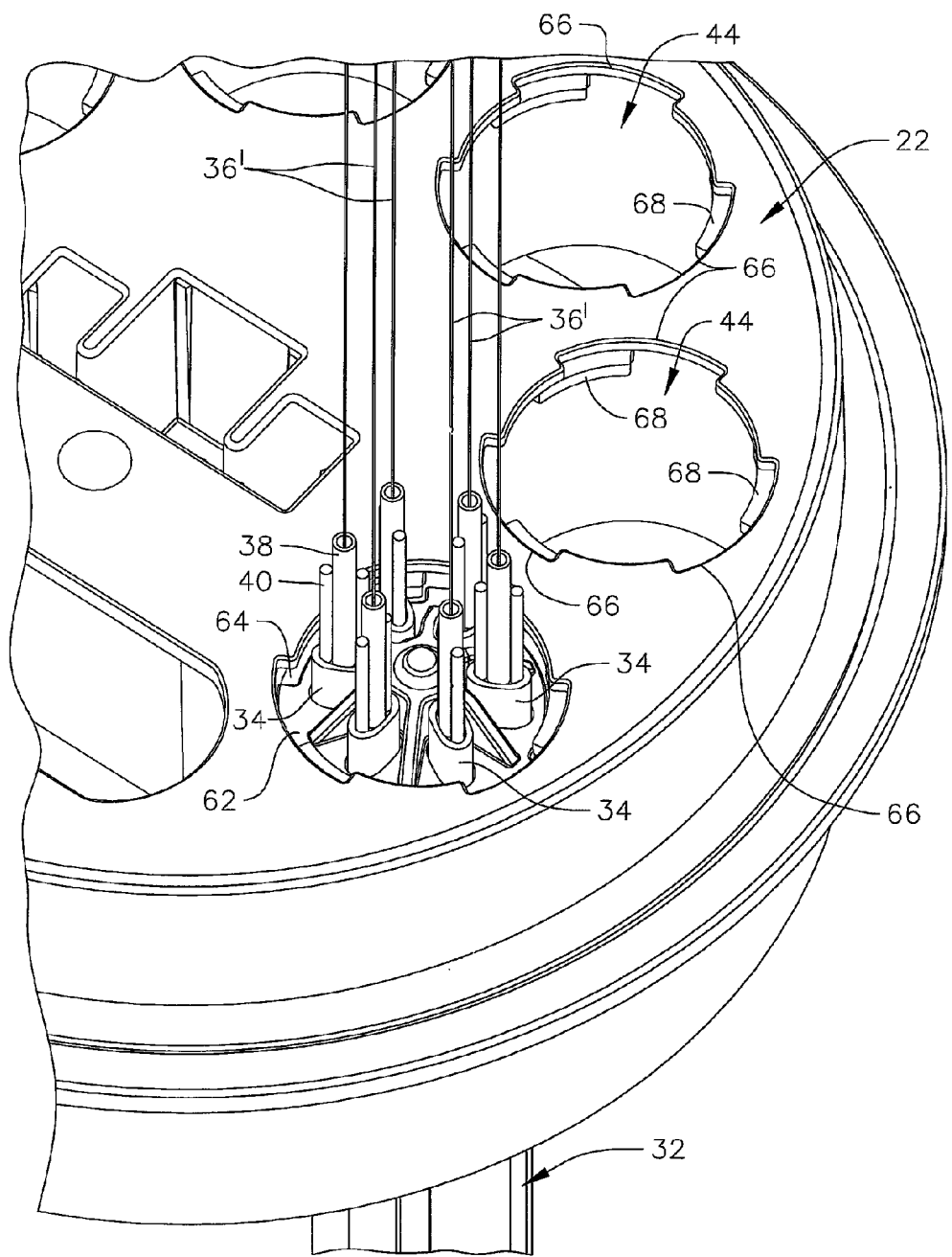
FIG. 4 is a perspective view showing the grommet assembly of FIG. 3 inserted in an enclosure base entry opening, along with tabs on a twist-lock mechanism contained in the compression grommet assembly, where the tabs have been aligned with the entry opening in the enclosure base.

FIG. 4 shows the compression grommet assembly during its initial insertion into the opening 44 in the enclosure base, loosely fitted into its initial position in the entry hole 44. Locking tabs 62 on the upper pressure plate (described in more detail below) are aligned with a keyed upper portion of the opening 44 in the enclosure base (described below). The wires 36' are shown unsupported by the buffer tubes which are cut off in FIG. 4, for clarity.

Figure 5:
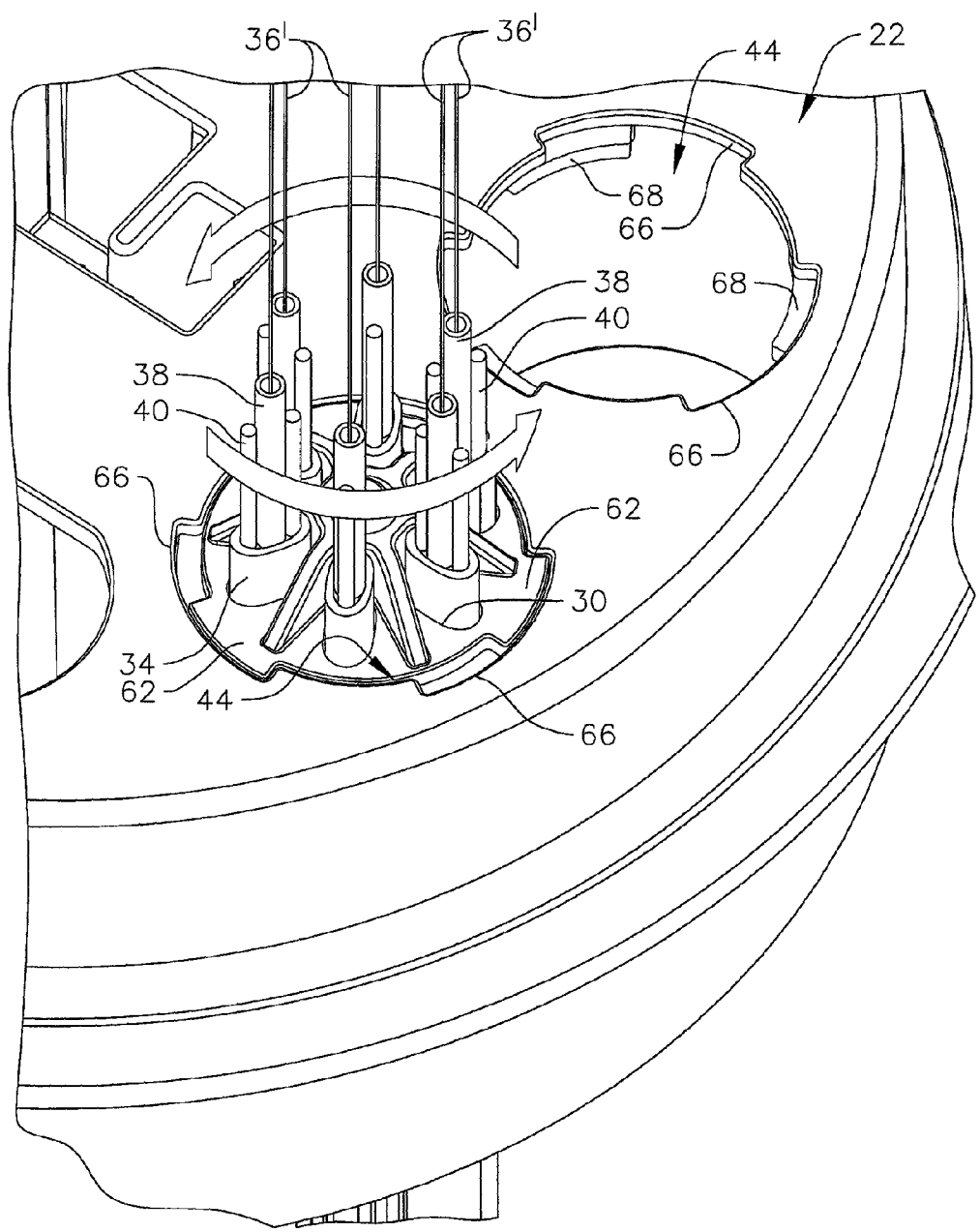
FIG. 5 is an enlarged perspective view showing the complete grommet assembly that has been rotated approximately 30 degrees in a counter-clockwise direction, to a locked position in the enclosure entry opening, to prevent removal of the grommet from the opening.

FIG. 5 shows the compression grommet assembly having been fully inserted into the base opening 44 and then rotated in a counter-clockwise direction (to a locked position) as shown by the arrows in FIG. 5. FIG. 5A shows a similar view, but with the buffer tubes cut off, for clarity. In the illustrated embodiment, the grommet assembly is twist-locked (rotated) through an angle of about 30° from its initial unlocked position in the opening (FIG. 4) to the locked position in FIG. 5. (Construction of the twist-lock mechanism is described in more detail below.) In its locked position the grommet assembly is prevented from being dislodged from its base opening 44 while in its unsealed position in the opening 44. The grommet assembly is preferably rotated to the locked position manually from below the base plate 22. The assembly can be rotated on its axis, using the stiffness of the cables extending downwardly away from the bottom of the base plate to apply the necessary leverage.

FIG. 6 shows the next step in the process in which the grommet assembly is compression-sealed in the base opening 44, using a tool to apply a compression force from a position outside of the enclosure. This view illustrates use of the tool, such as a standard nut driver 48, being used to tighten pressure-applying components of the grommet assembly, to compress the rubber or elastomeric grommet material in the opening, for sealing the grommet in the opening. Applying compression to the grommet also at the same time seals the drop cables in their respective passageways through the grommet assembly.

FIGS. 7-10 best illustrate components of the compression grommet assembly useful in sealing the grommet in the base opening while also sealing the grommet to the drop cables passing through it. FIG. 7 shows elements of the grommet assembly in a "relaxed" position in the base opening, i.e., prior to applying the compression force. The dimension X shown in FIG. 7 illustrates the vertical dimension of the grommet assembly in its relaxed state. The cross-sectional view shows the drop cable 32 extending through one of the passageways formed by the opening 42 in the lower pressure plate 28, the passage 44 through the grommet 24, and the opening 30 in the upper pressure plate 26. The grommet assembly also includes an adjustable connector assembly which includes an elongated bolt 50 extending vertically through a central passageway in the grommet assembly. The bolt has its head 51 engaging a washer 52 at the base of the lower pressure plate. The bolt is preferably made of stainless steel. The central passageway is formed by vertically aligned openings 53, 54 and 56 in the lower pressure plate, the grommet, and the upper pressure plate, respectively.

The bolt 50 is held in a fixed position in the central passageway by having threaded it into an internally threaded tubular insert 57 affixed to the upper pressure plate in alignment with the central passageway through the grommet. The insert is preferably made of brass and molded into the upper pressure plate. The head 51 on the bolt is positioned below the lower pressure plate and can be tightened to apply the compressive force to the grommet. Tightening of the bolt against the bottom of the lower pressure plate causes the upper and lower pressure plates to squeeze against the grommet 24 to apply a compressive force to the grommet. The force acts against the walls of the opening 44 in the base, as shown in FIG. 9, which illustrates the grommet assembly in its compressed state. The dimension Y in FIG. 9 illustrates the depth-wise shortening of the grommet in the opening 44 caused by compressing the grommet against the wall of the opening to apply the pressure sufficient to form the seal.

Figure 11:
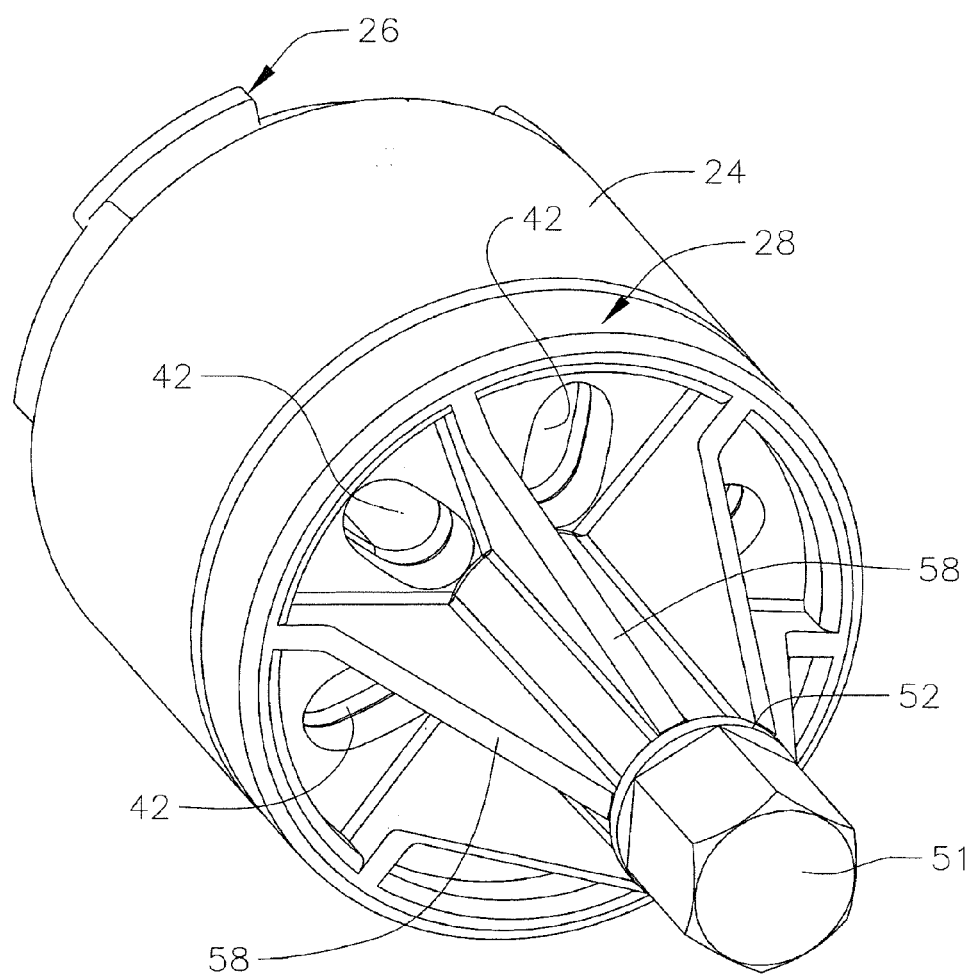
FIG. 11 is a bottom perspective view showing the construction of the grommet assembly's lower pressure plate and its means for applying the compression force to the grommet assembly.

FIG. 11 is a bottom perspective view of the compression grommet assembly which shows more detailed construction of the lower pressure plate 28. The spaced apart bottom holes 42 in the lower pressure plate are positioned between radially extending ribs 58 that converge toward the center bottom of the lower pressure plate. The ribs 58 distribute the force of the bolt evenly over the lower pressure plate. The enlarged length of the ribs allows easier access for tightening the bolt.

The grommet 24 is preferably made from a rubber or elastomeric material. One useful grommet material is an injection moldable thermoplastic elastomer, and another is made from silicone rubber, or a urethane rubber. Certain blended elastomeric materials made from Kraton styrenic block copolymers may be useful to produce the desired compressibility properties. The material should be of a relatively low hardness, preferably having a Shore A hardness from about 10 to 40, and more preferably from about 20 to 30. Such materials are useful in sealing around irregular-shaped cables, in addition to standard shapes.

The twist-lock function of the invention is best understood by referring to the detailed construction of the upper pressure plate 26. This is best illustrated in FIGS. 1 and 1A, and in FIGS. 12-14 which show the upper pressure plate unobstructed by the cables 32, for clarity. The upper pressure plate 26 of each grommet assembly includes a profiled outer edge that is keyed to a cooperating profiled interior surface near the top of the each corresponding entry hole 44 in the enclosure base.

A plurality of outwardly projecting narrow profile tabs 62 are circumferentially spaced apart around the outer edge of the upper pressure plate. In the illustrated embodiment, there are three of these tabs equally spaced apart around the edge of the upper pressure plate. Each of these tabs is positioned at the top of the upper pressure plate, and each tab is positioned adjacent an adjoining recessed shoulder 64 on the upper pressure plate. Each shoulder has a width about the same as a width of the adjacent tab.

Figure 12:
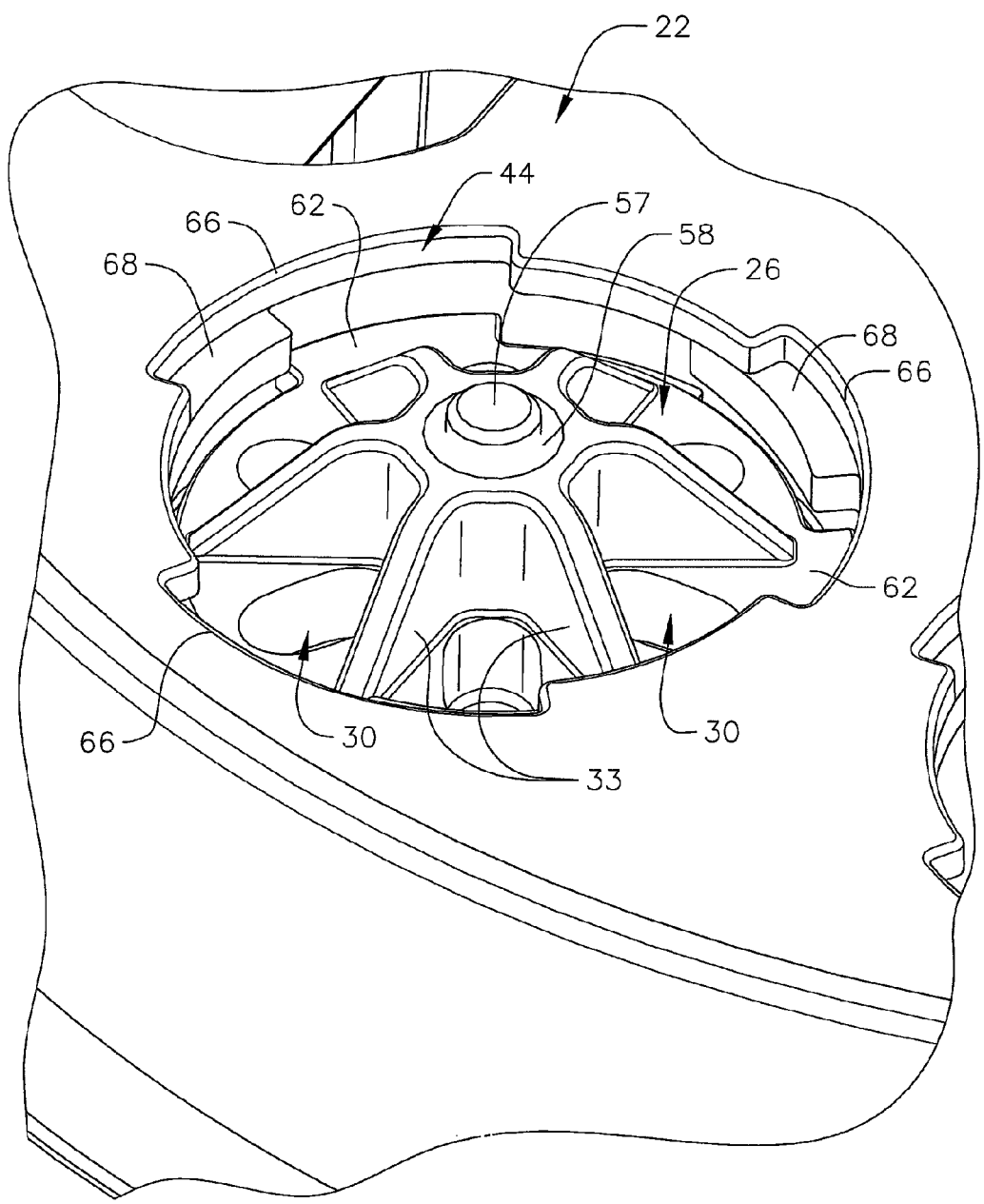
FIG. 12 is an enlarged perspective view, with the drop cables removed for clarity, showing the grommet assembly during its insertion into the base of the enclosure.

FIG. 12 best illustrates the keyed opening on the interior surface of the entry hole 44. The keyed portion of the entry hole preferably comprises three circumferentially spaced apart circularly curved slotted areas 66, projecting out from a top portion of the entry hole. A separate narrow ridge 68 extends below the top of each slotted area 66. Each ridge 68 has a flat upper surface spaced below the top of the slotted area into which it protrudes. Each ridge has a width of about half the length of its adjacent slotted area. The combined width of each tab 62 on the upper pressure plate and the ridge 68 in a corresponding entry hole is slightly less than the total length of each corresponding slotted area 66.

Figure 13:
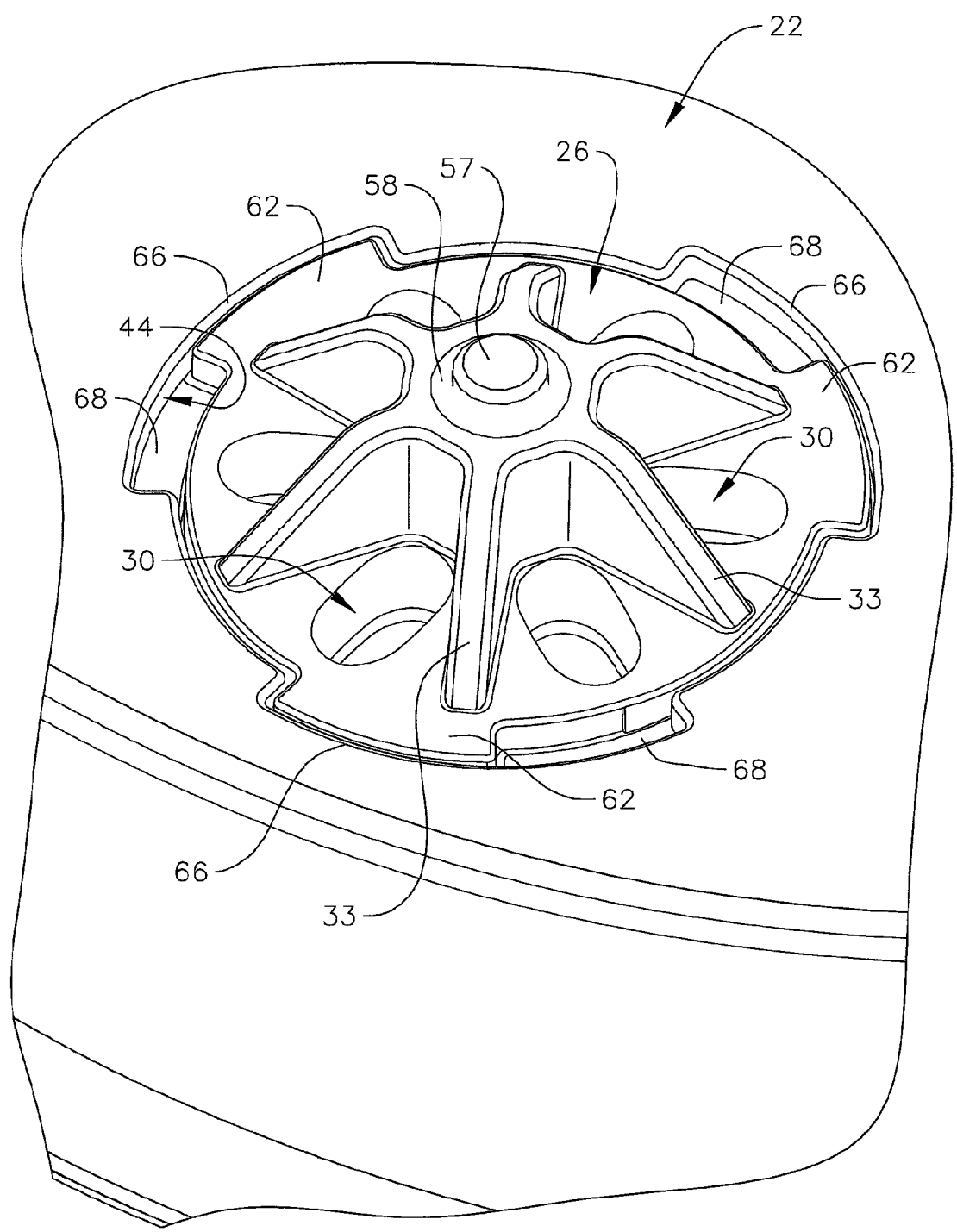
FIG. 13 is an enlarged perspective view showing the grommet assembly of FIG. 11 fully inserted into the base opening.
Figure 14:
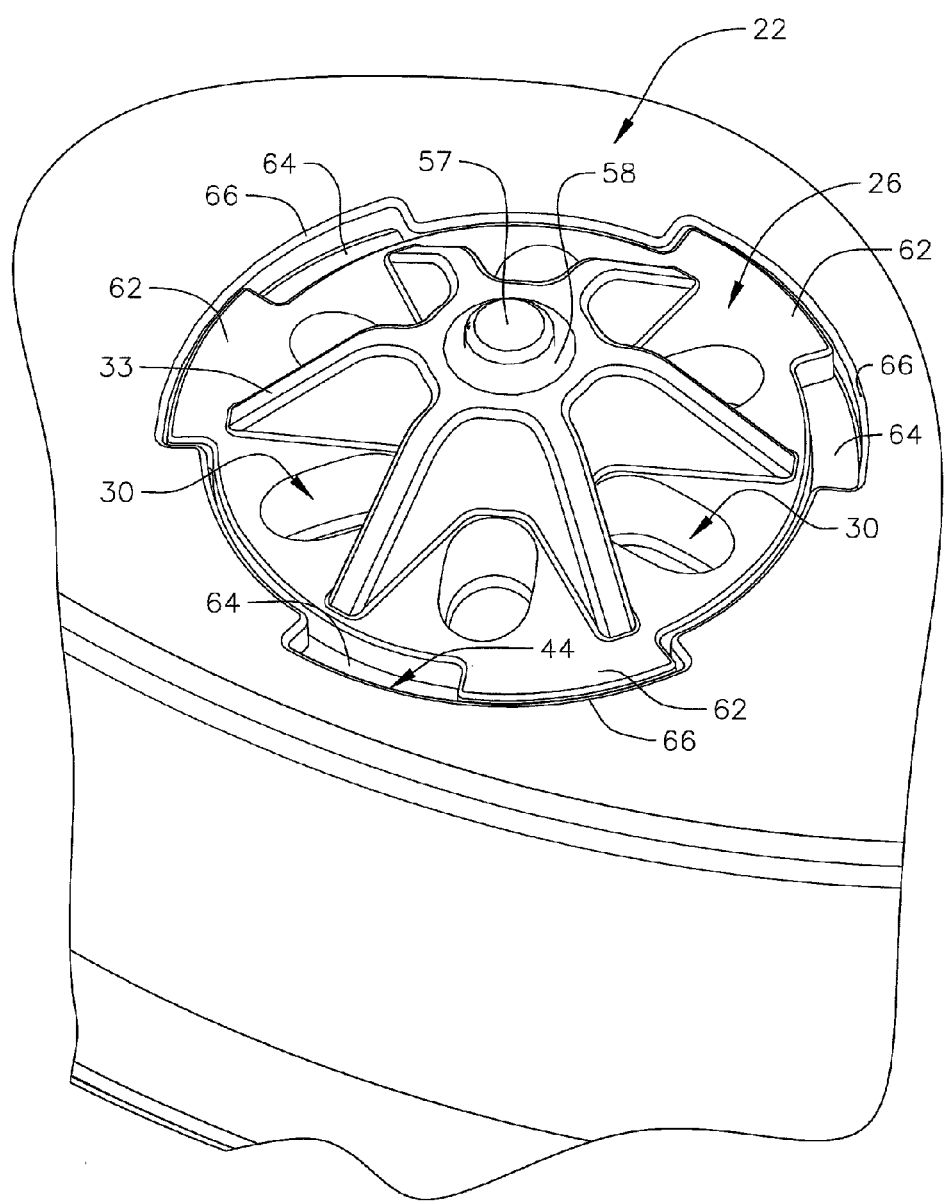
FIG. 14 is an enlarged perspective view showing the grommet assembly of FIG. 12, rotated from its position in FIG. 12 and showing the grommet assembly in a locked position.

FIGS. 12-14 best illustrate the twist-lock process. FIG. 12 shows the grommet assembly during insertion into the entry hole of the base. The locking tabs 62 are first aligned with the keyed opening in the base, and the grommet assembly is then pushed upwardly through the entry hole to the position shown in FIG. 12, below the profiled upper portion of the keyed entry hole.

FIG. 13 shows the grommet assembly fully inserted into the entry hole, but not rotated into its locked position. In the position shown in FIG. 13, the tabs 62 are engaged in the slotted areas 66 and positioned adjacent the ridges 68 on the keyed opening.

FIG. 14 shows a grommet assembly having been rotated about 30 degrees counter-clockwise into its locked position. Here, the tabs 62 are rotated over the ridges 68 so that the interference between the two keyed portions can prevent the grommet assembly from being dislodged from the entry hole. In the view shown in FIG. 14, the trailing shoulders 64 on the upper pressure plate are shown adjacent the trailing edge of each tab 62.

In the position shown in FIG. 14, the grommet assembly is still in its relaxed or unsealed position in the entry hole, and once the connector assembly (described previously) has been tightened to apply the compression force, the grommet assembly cannot be rotated to the unlocked position.

The cables entering the enclosure through their corresponding grommet assemblies can be spliced to other communication lines within the fiber distribution enclosure in the usual manner. The sealed holes can provide passageway for fiber optic cables of various types, including main distribution cable or feeder cable, branch cables and/or drop wire cables, or other communication cables as mentioned previously. The interior of the distribution enclosure can include an upright support bar and other support structures (not shown) for holding fiber splice trays (not shown) or means for making splice connections or modifications in the interior of the enclosure. Such fiber splice connections are illustrated, for example, in applicant's published US Patent Application No. 2011/0262094, which is incorporated herein, in its entirety, by this reference.

Figure 15:
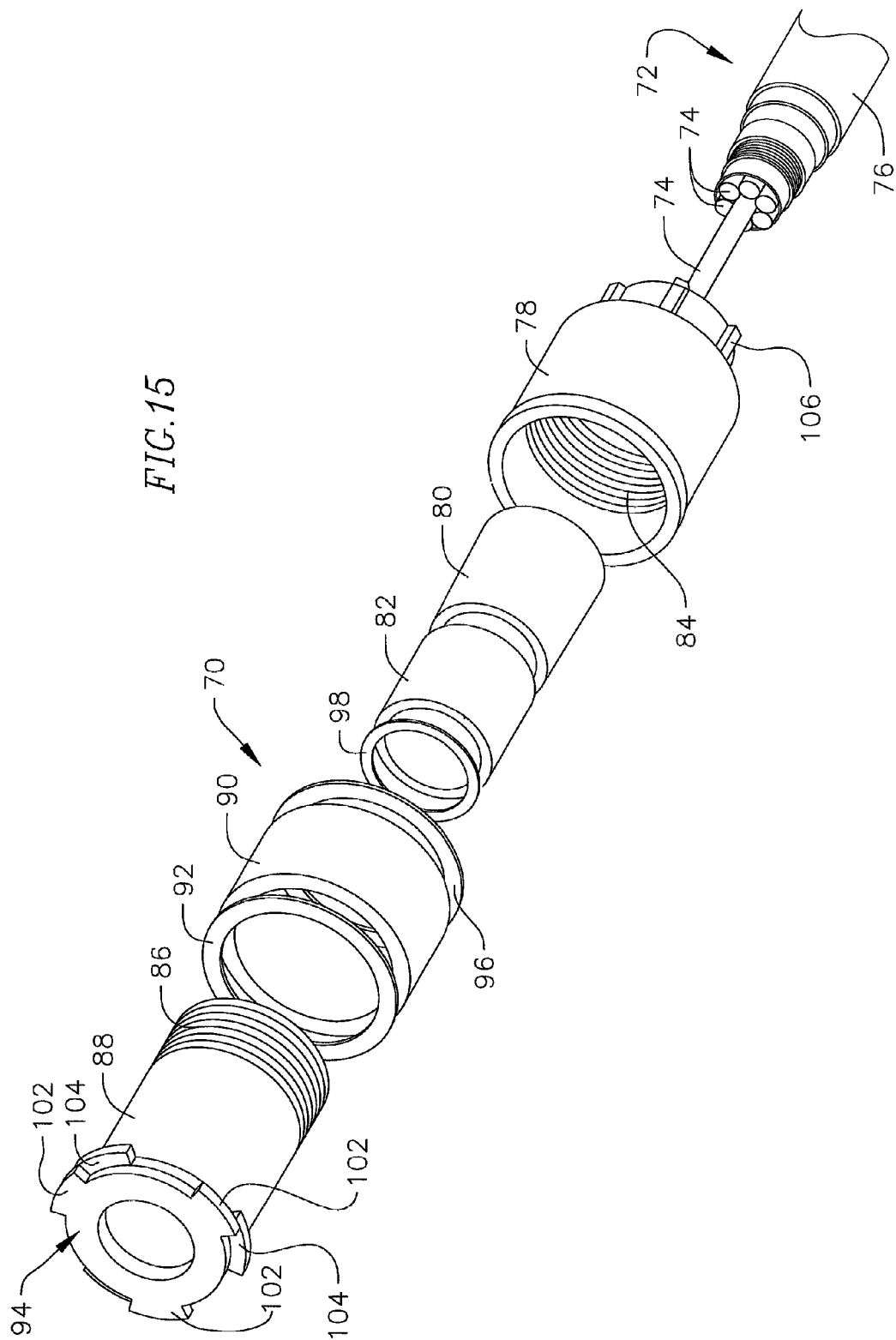
FIG. 15 is an exploded perspective view showing components of an alternative form of the compression grommet assembly, which is used for a larger-diameter, multi-fiber cable.

FIG. 15 illustrates an alternate form of the invention in which a grommet assembly 70 is adapted for sealing a large-diameter multi-fiber cable 72 in the entry hole of a fiber splice enclosure. In this embodiment, the cable core comprises a bundle of separate glass fiber wires contained in corresponding buffer tubes 74. The individual glass fiber wires (and their buffer tubes) are contained in an outer sheath 76 and several other protective layers of sheathing that form a relatively rigid multi-fiber cable.

FIG. 15 also illustrates one example of the cable having been prepared prior to subsequent cable splicing. In this example, the sheathing at the end of the cable has been stripped away and one of the buffer tubes and its glass fiber wire are exposed. They extend loosely away from the rest of the cable for subsequent splicing to transmitting and receiving equipment inside the enclosure.

Referring to the exploded assembly view of FIG. 15 and the cross-sectional view of FIG. 16, the grommet assembly 70 includes a tubular bottom cap 78, a plastic spacer 80 contained in the lower portion of the bottom cap, and a tubular inner grommet 82 above the spacer. The inner grommet is contained in an upper portion of the bottom cap, in alignment with the lower spacer. The inner grommet can be made from substantially the same compressible grommet materials described previously. The spacer 80 and the inner grommet 82 are both of narrow profile and both are in contact with the outer surface of the cable, along the inside of the bottom cap, when the cable extends through the grommet assembly during use.

An internally threaded lower section 84 of the bottom cap 82 is radially spaced from the adjacent tubular spacer 80. This leaves a narrow annular space within the bottom cap for receiving an externally threaded annular lower portion 86 of a tubular fixed housing 88 which is threaded into the inner portion 84 of the bottom cap during use.

A tubular outer grommet 90 is seated on an annular top edge of the bottom cap, to position the outer grommet spaced radially outwardly from the inner grommet. Both grommets are aligned on a common central axis through the assembly. The inner and outer grommets are spaced apart on opposite sides of the downwardly facing non-threaded tubular portion of the housing 88. The inside diameter of the outer grommet 90 contacts the tubular outer surface of the housing, and the outside diameter of the inner grommet 82 contacts the inner surface of the housing.

An outer washer 92 rests on the annular top edge of the outer grommet, making pressure contact with a flanged upper portion 94 of the housing. Another outer washer 96 makes pressure contact between the top edge of the bottom cap 78 and the annular lower edge of the outer grommet 90. An inner washer 98 makes pressure contact between the top edge of the inner grommet 82 and an annular inner shoulder inside the flanged upper portion 94 of the housing.

The flanged upper portion 94 of the upper housing 88 is constructed similar to the upper pressure plate 26, to provide a means for twist-locking the grommet assembly 70 in the entry hole of the enclosure, during use.

The components of the grommet assembly, when assembled for use as shown in FIG. 16, cooperate to form a central passageway 100 along the central axis of the assembly.

In use, the multi-fiber cable 72 is inserted through the central opening 100 in the grommet assembly, from outside the cable splice enclosure. The end of the cable then can be prepared for splicing, as shown in FIG. 16, from outside the cable splice enclosure.

The cable 72, after having been inserted through the grommet assembly, as shown in FIG. 16, is then inserted into the entry hole in the base of the enclosure, as described previously. The assembly is initially inserted into the base opening with locking tabs 102 on the upper portion 94 of the housing aligned with a keyed upper portion of the opening, similar to the keyed portion 66-68 of the opening 44, described previously.

After the top section of the grommet assembly is fully inserted into the base opening, the assembly can be rotated on its axis, away from its unlocked position to a locked position. The assembly is twist-locked into its locked (but unsealed) position by rotating the bottom cap from a position outside the enclosure. The outer edge of the upper portion 94 of the housing 88 is profiled similar to the upper pressure plate 26, which is keyed to a similarly profiled keyed upper section of the base opening. Each of the tab 102 includes an adjacent recessed shoulder 104. The keyed inner portion of the base opening includes curved slotted areas and a separate narrow ridge below each slotted area, as described previously. The bottom cap includes vertically extending spaced apart ribs 106 to facilitate manually rotating the grommet assembly on its axis.

After the grommet assembly is rotated to its locked position, the assembly is sealed in the opening, from a compressive force applied from outside the enclosure. The bottom cap 78 rotates on its axis causing the threaded inside section 84 to move upward against the resistance of the fixed upper housing 88 which has been locked in the opening. This compresses both grommets 82 and 90, causing them to seal against the cable and at the same time to seal against the inside of the opening.

The invention claimed is:

1. A cable splice enclosure, comprising:
   a base plate and at least one entry hole formed in the base plate for passing a cable to a cable-splicing region in the enclosure above the base plate;
   a grommet assembly having an unsealed position disposed in the entry hole, the grommet assembly comprising:
   an upper pressure plate,
   a lower pressure plate,
   a compressible grommet positioned between the upper and lower pressure plates, and
   at least one passageway extending in alignment through the lower pressure plate, the grommet, and the upper pressure plate, the passageway providing access to the cable-splicing region of the enclosure for a cable disposed in the passageway;
   an elongated adjustment tool engaged with the upper pressure plate and extending depthwise therefrom, through the grommet and through the lower pressure plate, for access thereto from an exterior position below the lower pressure plate; and
   a grommet locking assembly comprising:
   a locking tab on an outer edge of at least one of the pressure plates, and a keyway formed along an inside portion of the entry hole,
   the grommet locking assembly movable from said unsealed position thereof to a locked position in the entry hole in which the locking tab and keyway are interlocked in response to a first rotational adjustment of the adjustment tool;
   the pressure plates movable axially toward each other to compress the grommet between them in response to a second rotational adjustment of the adjustment tool which holds the grommet in a compressed state sealed to the entry hole and which seals the cable to the passageway while the grommet locking assembly maintains its locked position in the entry hole of the base plate.

2. The enclosure according to claim 1 in which the adjustment tool comprises a screw-threaded bolt and nut combination coupled between the upper and lower pressure plates, the bolt engaged with the lower pressure plate so that tightening of the bolt into the nut applies a compressive force to the grommet and the lower pressure plate.

3. The enclosure according to claim 1 in which the cable comprises an optical fiber cable having a spliced connection in the cable-splicing region of the enclosure.

4. The enclosure according to claim 1 in which each grommet assembly includes a plurality of passageways for positioning separate cables in the passageways and passing them into the enclosure.

5. The enclosure according to claim 1 in which the base plate is exposed to the exterior of the enclosure, and in which a splicing support is secured to the base plate in the cable-splicing region of the enclosure for maintaining a spliced connection to the cable.

6. A method for sealing a drop cable in a cable splice enclosure which includes a base plate, and at least one entry hole formed in the base plate for passing a drop cable to a cable-splicing region inside the enclosure above the base plate, the method comprising:
   at a site exterior to the enclosure, providing a grommet assembly which includes an upper pressure plate; a lower pressure plate; a compressible grommet positioned between the upper and lower pressure plates; at least one passageway extending in alignment through the lower pressure plate, the grommet, and the upper pressure plate, the passageway providing access to the cable-splicing region of the enclosure for a drop cable disposed in the passageway; and a locking tab on an outer edge of at least one of the pressure plates;
   the grommet assembly further including an elongated adjustment tool engaged with the upper pressure plate and extending depthwise through the grommet and through the lower pressure plate for access thereto from an exterior position below the lower pressure plate;
   the entry hole in said base plate having a keyway formed along an inside portion thereof, the grommet assembly movable from an unsealed position in the entry hole to a locked position therein in response to interlocking of the locking tab and keyway via a first rotational adjustment of the adjustment tool;
   the method further including passing a drop cable through the passageway in the grommet assembly, from a position exterior to the enclosure, and positioning the grommet assembly in the entry hole from a position exterior to the enclosure's base plate;
   locking the grommet assembly in the entry hole, from a position exterior to the enclosure, via the first rotational adjustment of the adjustment tool; and
   moving the pressure plates toward each other, from a position exterior to the enclosure, to compress the grommet between them via a second rotational adjustment of the adjustment tool which holds the grommet in a compressed state sealed to the entry hole and which seals the cable to the passageway while the grommet assembly maintains its locked position in the entry hole of the base plate.

7. The method according to claim 6 including the step of preparing the cable for splicing, from a position exterior to the enclosure, and passing the prepared cable into the enclosure from the exterior of the enclosure.

8. The method according to claim 6 in which the drop cable is an optical fiber cable.

9. The method according to claim 6 which includes applying an optical fiber cable splice to the optical fiber after the cable is sealed in the passageway of the grommet assembly but prior to installing the grommet assembly in the entry hole.

10. The method according to claim 6 in which the grommet assembly is loosely fitted into the entry hole when positioned therein and then movable to the locked position in the entry hole before the adjustment step that completely compresses the grommet.

11. The method according to claim 6 in which each grommet assembly includes a plurality of passageways; and including positioning separate ones of said cables in the passageways and passing them into the interior of the enclosure prior to locking the grommet assembly in the entry hole.

12. A cable splice enclosure assembly, comprising:
   a base plate and at least one entry hole formed in the base plate for passing a cable to a cable-splicing region in the enclosure above the base plate;
   a grommet assembly adapted for positioning in the entry hole, the grommet assembly comprising:
   an upper pressure plate,
   a lower pressure plate,
   a compressible grommet positioned between the upper and lower pressure plates, and at least one passageway extending in alignment through the lower pressure plate, the grommet, and the upper pressure plate, the passageway providing access to the cable-splicing region of the enclosure for a cable adapted for positioning in the passageway;

an elongated adjustment tool adapted to engage the upper pressure plate and extending depthwise therefrom through the grommet and through the lower pressure plate, for access thereto from a position below the lower pressure plate; and a grommet locking assembly comprising:
- a locking tab on an outer edge of at least one of the pressure plates, and
- a keyway formed along an inside portion of the entry hole,
- the grommet locking assembly movable from an unsealed position thereof in the entry hole to a locked position therein in which the locking tab and keyway are interlocked in response to a first adjustment of the adjustment tool;

the pressure plates movable axially toward each other to compress the grommet between them in response to a second adjustment of the adjustment tool which holds the grommet in a compressed state sealed to the entry hole and which seals the cable to the passageway while the grommet locking assembly maintains its locked position in the entry hole of the base plate.

13. The enclosure according to claim 12 in which the adjustment tool comprises a screw-threaded bolt and nut combination coupled between the upper and lower pressure plates, the bolt engaged with the lower pressure plate so that tightening of the bolt into the nut applies a compressive force to the grommet and the lower pressure plate.

14. The enclosure according to claim 12 in which the cable comprises an optical fiber cable having a spliced connection in the cable-splicing region of the enclosure.

15. The enclosure according to claim 12 in which each grommet assembly includes a plurality of passageways for positioning separate cables in the passageways and passing them into the enclosure.

16. The enclosure according to claim 12 in which the base plate is exposed to the exterior of the enclosure, and in which a splicing support is secured to the base plate in the cable-splicing region of the enclosure for maintaining a spliced connection to the cable.

* * * * *